April 9, 1940.                D. O. McCLAY                    2,196,814
                       MULTIPLE CHAMBER PNEUMATIC TIRE
                          Filed Oct. 6, 1938            2 Sheets-Sheet 1
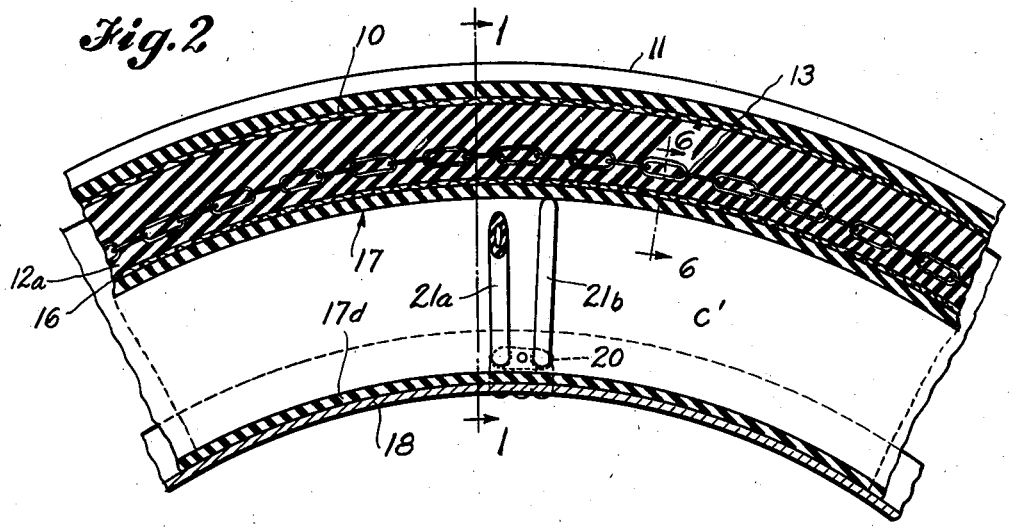
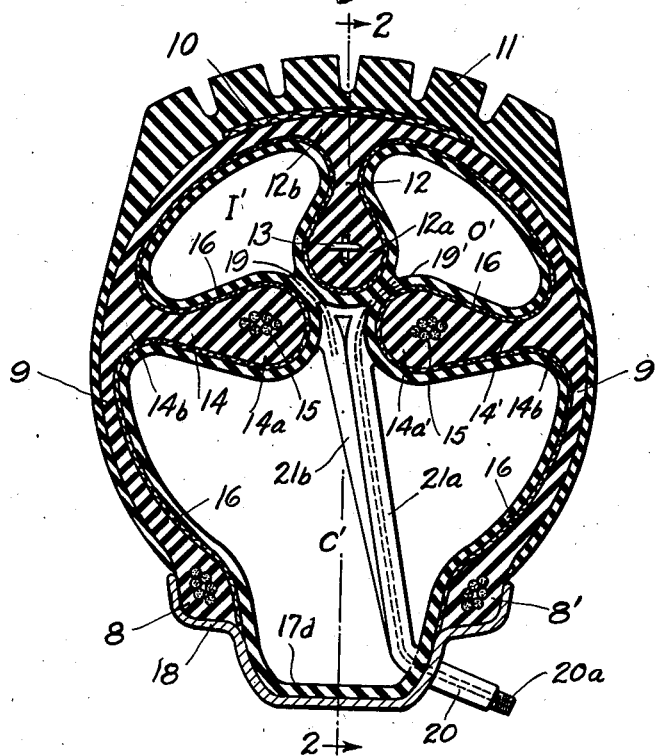
INVENTOR.
David O. McClay
BY:- Cox & Moore
ATTORNEYS April 9, 1940.    D. O. McCLAY    2,196,814
MULTIPLE CHAMBER PNEUMATIC TIRE
Filed Oct. 6, 1938    2 Sheets-Sheet 2

INVENTOR.
David O. McClay
BY: Cox & Moore
ATTORNEYS.

Patented Apr. 9, 1940

2,196,814

UNITED STATES PATENT OFFICE 2,196,814

MULTIPLE CHAMBER PNEUMATIC TIRE

David O. McClay, Seattle, Wash.

Application October 6, 1938, Serial No. 233,616

11 Claims. (Cl. 152—339)

This invention relates in general to pneumatic tires, and in particular to improvements in inside reinforcements for prolonging the utility of the tire.

The preferred embodiment of the invention herein disclosed comprises a tire casing having a plurality of inwardly projecting and circumferentially disposed annular reinforcements or ribs that are of the same material as, and are made integral with, the body of the tire, the inner edge portion of each of said reinforcements being reinforced with a suitable flexible metallic core. Said ribs are adapted to form a supporting reinforcement for the tread and side wall portions of the tire casing, and their arrangement is such that they form a plurality of inter-connected interior chambers, into which preferably corresponding physically inter-connected but pneumatically independent inner-tube sections are adapted to fit.

The medially joined aforesaid inner-tube sections are so disposed as to contact the rounded inner edge portions of the aforesaid ribs, and the several tubular sections are constructed to conform in shape to the corresponding chambers of the tire casing in which they are placed. The wall of the inner-tube section positioned next to the wheel preferably is heavily reinforced where it contacts the rim of said wheel and the bead portions of the tire casing in the usual way to prevent chafing the tube.

The inner-tube structure illustrated is provided with a unitary set of valve stems comprising three separate and distinct valves, one of which leads directly to the large section next to the rim, which I designate as the center air-chamber section of the inner tube. The other valve stems connect to flexible tubes that lead respectively to the inside and outside smaller air-chamber sections, as viewed from the side of the car.

By means of this arrangement it will be seen that each independent air chamber may be inflated to that pressure which will have been found to be best adapted for the service in which the tire is employed; and in case any one of the separate air chambers is punctured or should blow out, the construction is such that the remaining air-chamber sections, in combination with the support provided by the reinforcing ribs, are sufficient to prevent the complete collapse of the tire until the vehicle can be brought to a stop and the required repairs can be made.

To facilitate inflating the tire I prefer to mark the valve stems inside, outside and center, respectively, to identify the several inner-tube sections to which each is connected.

An object of the invention is to provide an improved pneumatic tire having a plurality of separate air chambers, so arranged and supported by a plurality of interior circumferentially disposed annular ribs built into the tire casing, that in case one of said chambers blows out or is punctured, the others will continue to support the vehicle until repairs can be made.

Another object is to provide an improved pneumatic tire having a plurality of air chambers which may be inflated to different pressures to enhance the riding qualities of the vehicle and to prolong the life of the tire.

A further object is to provide a pneumatic tire having a plurality of independent air chambers in which interior annular ribs made integral with the tire casing are adapted to support the tire wall and tread-wall portions cooperatively with the air pressure in said chambers, thereby greatly increasing the strength and prolonging the life of the tire.

Other objects and advantages of my improved tire will be apparent to those skilled in the art from the following detailed description of a preferred form of the invention, which consists of certain parts in cooperative combination, as hereinafter described, illustrated in the accompanying drawings and embraced in the appended claims.

In the drawings:

Figure 1 is a transverse section through the tire of my invention at the position indicated by broken line 1—1 of Fig. 2, showing the inner-tube structure and casing in place upon what is known in the art as a drop-center wheel rim, together with the flexible tubes leading from the valve-stem unit to the smaller independent air chambers;

Fig. 2 is a fragmentary medial sectional elevation of the aforesaid assembly taken on broken line 2—2 of Fig. 1 to a smaller scale;

Figure 3:
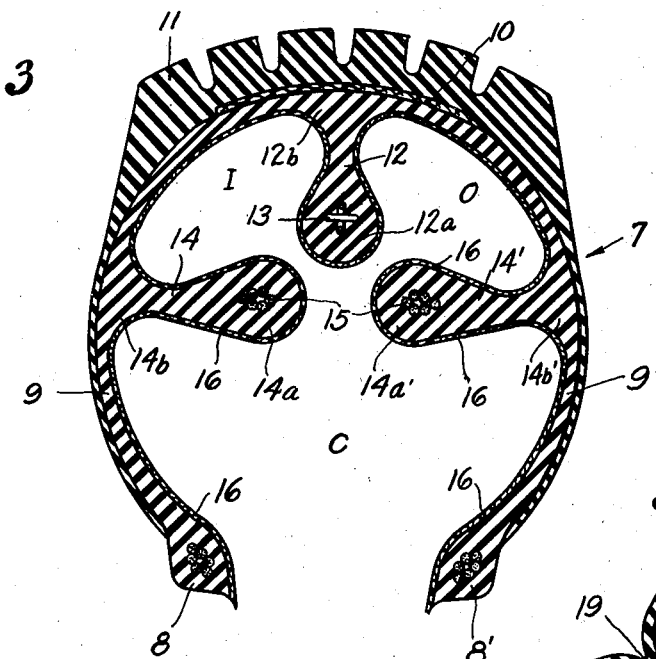
Fig. 3 is a transverse sectional elevation of the tire casing only of the assembly shown in Fig. 1.

Like reference numerals are used to indicate like parts throughout the drawings, wherein 7 indicates the casing as a whole of the tire embodying my improved construction. Referring to Fig. 3, it will be seen that said tire casing comprises the usual reinforced beads indicated at 8 and 8', with which are incorporated the usual side wall construction 9, breaker strip 10, and tread 11.

In addition to said usual elements of construction, I add an inwardly projecting and circumferentially disposed central annular rib element 12 having a bulbous inner edge portion 12a, preferably provided with a medial flexible metallic reinforcing ring 13. Said metallic reinforcing ring may be a continuous chain, the links of which are clearly shown in the drawings.

Projecting inwardly from the respective side walls of the casing are a pair of similar annular rib elements 14 and 14' having bulbous edges 14a and 14a', respectively, each of which may be reinforced with a plurality of medially disposed steel strands 15, each of which is composed of a large number of twisted high-tensile-strength steel wires of small diameter to assure a maximum of strength and a minimum of resistance to flexure.

Portions 12b, 14b, and 14b', respectively, of ribs 12, 14, and 14' that connect with the inner face and side wall portions of the tire casing, preferably are built into said wall portions at the time the tire is made, thereby making them integral with the tire casing itself, as will be apparent to those skilled in the art of tire manufacture. It is important that the interior surfaces of interconnected chambers O, I, and C of the tire casing be smooth with well rounded corners, and they preferably are provided to this end with a cord fabric lining which is continuous from bead portion 8 on one side of said casing including projections 14, 12, and 14', respectively, to the other bead portion 8' thereof, as indicated by numeral 16.

Figure 6:
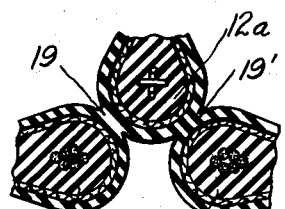
Fig. 6 is a fragmentary transverse section showing the medial joined portions of the inner-tube structure to the same scale as in Fig. 1, but taken at the position indicated by broken line 6—6 of Fig. 2.
Figure 4:
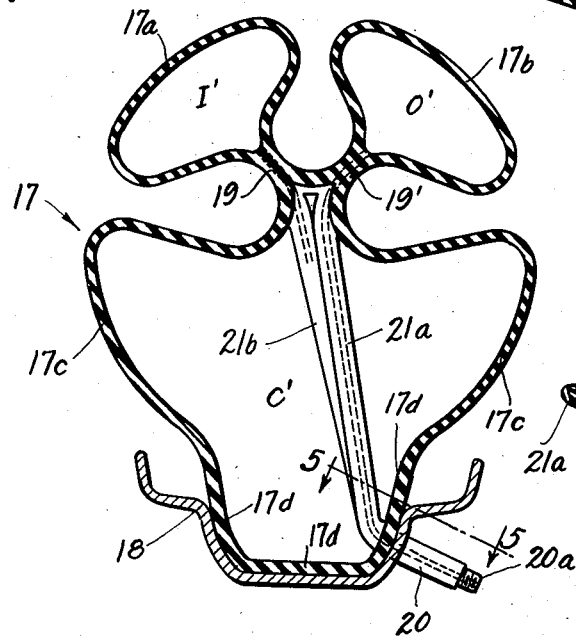
Fig. 4 is a like transverse sectional elevation of the inner-tube structure and drop-center rim portions of the aforesaid assembly.

The inner-tube structure as a whole, hereinafter referred to also as the inner tube, is indicated by the numeral 17, and the wheel rim by the numeral 18. Referring to Fig. 4, it will be seen that the walls of the inner tube are shaped to conform to the interior surfaces of the tire casing illustrated in Fig. 3. It will be apparent that tubular portion 17a of the inner tube will fit readily within chamber I of the tire casing, and that likewise tubular portion 17b of the inner tube will fit within chamber O of said casing, the balance of the interior of which is filled by tubular portion 17c of said inner tube, preferably reinforced heavily where it contacts beads 8 and 8' and the drop-center portion of the wheel rim, as indicated at 17d. The aforesaid tubular portions of the inner tube may be joined together by reinforced medial annular portions 19 and 19', which preferably are shaped to conform to bulbous edges 12a, 14a, and 14a' of ribs 12, 14, and 14', respectively, as shown clearly in Figs. 1, 4, and 6.

Figure 5:
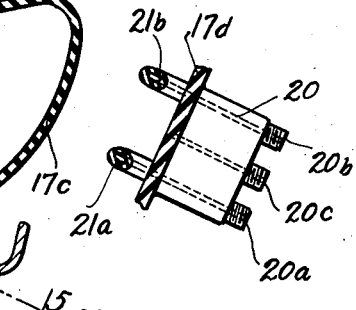
Fig. 5 is a plan view of the valve-stem unit, with a portion of the inner-tube structure and flexible connecting tubes in section, taken on broken line 5—5 of Fig. 4.

Valve-stem unit 20 may be vulcanized to the wall of the inner tube in the usual manner. In Figs. 4 and 5 it will be seen that center valve stem 20c connects directly with chamber C' of the inner tube, and that valve stems 20a and 20b are connected by means of flexible tubing elements 21a and 21b with chambers O' and I', respectively, of the inner tube. It will be apparent that this provides a separate valve stem connection for each of the three separate and independent air chambers of the inner tube, and that each of said chambers, if desired, may be maintained at a different air pressure. As a rule, however, I find that it is desirable to keep the air pressure in air chambers O' and I' at the same value.

It will be apparent from the foregoing description that, when the inner-tube sections are deflated, portion 17a may be forced between bulbous edges 12a and 14a into compartment I of the tire casing, and that likewise portion 17b of the inner tube then may be forced between bulbous edges 12a and 14a' into compartment O of said tire casing. Obviously, portion 17c then will occupy compartment C of said tire casing.

With the tire casing and inner tube thus assembled, they then may be installed on the drop-center rim portion of the wheel in the usual manner, after which separate compartments O', I', and C' may be inflated to the desired pressure by applying an air hose connection to valve stem terminals 20a, 20b, and 20c, respectively, in the usual way. When inflating the tire it is desirable, however, that the three compartments have their pressures increased more or less simultaneously. For example, in order to assure the proper engagement of bulbous edges 12a, 14a, and 14a' of the interior ribs with medial portions 19 and 19' of the inner tube, I prefer first to increase the pressure in chambers O' and I' by several alternate applications of the air hose connection to approximately one-half their respective desired pressures, after which the pressure may be increased in chamber c' to a like amount. Each said chamber then is further inflated in turn in steps of about 25% of the increase in pressure desired until the final pressure is had in each chamber.

After the tire is thus assembled and inflated, the relation between the several parts is illustrated clearly in Fig. 1, wherein it will be seen that the inner-tube portions are expanded snugly into contact with the inner walls of the several chambers into which the interior of the tire casing is divided by interior ribs 12, 14, and 14'. Attention is directed particularly to the medial portions 19 and 19' of the inner tube, which will be seen to provide a very substantial, yet flexible, support for the bulbous edge portions of the interior ribs. There is little or no opportunity for chafing between the said medial portions of the inner tube and said bulbous edge portions, because the several portions of the inner tube are expanded by the air pressure therein into firm contact with said edge portions, and because both the inner-tube and interior-rib portions are constructed of resilient materials, which permit their moving together as the load is shifted from one part to another of the tread of the rolling tire.

It will be apparent to those skilled in the art that I thus provide three separate and distinct compartments which may be inflated to considerably different pressures, if the operating conditions of the tire indicate this to be desirable. For example, when the vehicle is lightly loaded it sometimes is desirable to reduce the air pressure in compartments O' and I', thereby increasing the support of the tread portion of the tire by annular rib portion 12 with which are associated bulbous edge 12a and the flexible metallic support 13. In view of the fact that the load is carried by the tread portion of the tire, it follows that this will result in forcing a section of annular rib 12 and its appended parts inwardly against the medial portions of the inner tube, which in turn transmit the forces thus produced to bulbous edges 14a and 14a' of ribs 14 and 14', respectively, which in turn are supported by the air pressure in compartment C' of the inner tube. As the result of this construction, a comparatively small air pressure in compartments O' and I' is sufficient to support comparatively heavy loads, as will be clear from the following explanation:

Interior annular rib 12 and its appended parts in cooperative combination with the tread portion of the tire, constitute what may be considered as a flexible beam, resiliently supported throughout its entire length by ribs 14 and 14' together with their appended parts through the intermediacy of the medial portions of the inner tube, which portions are in turn supported by the air pressure within compartment C' of the inner tube, as may be seen to good advantage in Fig. 2 in combination with Fig. 1.

The substantially horizontally disposed top wall of the large portion of the inner tube in contact with ribs 14 and 14' is forced outwardly by the air pressure in chamber C'. As said air pressure urges bulbous portions 14a and 14a' outwardly, it will be seen that they in turn transmit the force thus exerted through medial portions 19 and 19' of the inner tube to bulbous edge portion 12a of rib 12, which in turn supports the medial portion of the tread wall that supports the load. The arrangement is such that medial portions 19 and 19' of the inner tube are so firmly gripped between said bulbous portions that they are prevented from slipping relative thereto, and the air pressure in chamber C' is thereby made effective in supporting the load carried by the tire, under extreme conditions, without any assistance from the usual air pressure in compartments O' and I' of the inner tube. Reinforcing rings 13 and 15 prevent the inner edge portions of their respective ribs from distorting or stretching seriously under abnormal operating conditions.

From the foregoing it follows that with the tire inflated as normally required for satisfactory operation, in case either compartment O' or compartment I' should be punctured or blow out, or in an extreme case both should fail at the same time, by means of my improved construction the pressure in compartment C' is made available automatically through the cooperation of the coacting parts to continue to support the load, thereby enabling the driver to continue to his destination at perhaps reduced speed, or in any event to bring the vehicle to a stop without accident, which so often is the result of a puncture or blow-out when tires of standard construction are employed.

It will be understood, of course, that the tire is adapted to carry its maximum load when all three compartments of the inner tube are inflated to their respective optimum pressures. Because of the supporting structure afforded by the interior annular ribs and multiple chamber construction, I find, however, that considerable deviation from the aforesaid optimum pressure is permissible without materially decreasing the life of the tire; and when inflation is properly maintained, the life of the tire is greatly increased.

Where the vehicle is required to traverse rough roads, it is desirable to reduce the pressure in chambers O' and I', as compared to the pressure employed in chamber C', thereby enhancing the riding qualities of the vehicle and prolonging the life of both the tire and the vheicle itself.

Blow-outs when traveling at a high rate of speed are extremely dangerous. When my tire is employed the blow-out of the air in any particular chamber through the corresponding casing wall of the tire, while serious, is decidedly less so than when such an accident occurs with the ordinary tire, for the reason that, in addition to a plurality of pneumatic chambers, I employ a tire casing having great inherent structural strength that serves as a substantial support until the vehicle can be brought to a stop.

It will be apparent to those skilled in the art, that the essential coacting elements of my invention may be combined in various other equivalent forms and proportions without departing from the purpose and intent of the invention within the scope of the appended claims.

Having described a preferred form of my invention, what I claim as new and desire to protect by Letters Patent is:

1. In a pneumatic tire of the class described, the combination of a tire casing divided into a plurality of inter-connected annular interior compartments by a plurality of inwardly projecting and circumferentially disposed annular ribs made integral with the wall portions of said casing, each said rib comprising a bulbous edge portion, and an inner-tube structure comprising physically connected but pneumatically independent annular tubular portions adapted to fit within the interior compartments of said tire casing with the means used for physically connecting said tubular sections disposed intermediate of the adjacent edges of said inwardly projecting ribs.

2. In a pneumatic tire of the class described, the combination of a tire casing divided into a plurality of inter-connected annular interior compartments by a plurality of inwardly projecting and circumferentially disposed annular ribs made integral with the wall portions of said casing, each said rib comprising a bulbous edge portion, a continuous fabric lining for said interconnected compartments, and an inner-tube structure comprising physically connected but pneumatically independent annular tubular portions adapted to fit within the interior compartments of said tire casing with the means used for physically connecting said tubular sections disposed intermediate of the adjacent edges of said inwardly projecting ribs.

3. In a pneumatic tire of the class described, the combination of a tire casing divided into a plurality of inter-connected annular interior compartments by a corresponding number of inwardly projecting and circumferentially disposed annular ribs made integral with the wall portions of said casing, each said rib comprising a bulbous edge portion, an inner-tube structure comprising physically connected but pneumatically independent annular tubular portions adapted to fit within the interior compartments of said tire casing with the means used for physically connecting said tubular sections disposed intermediate of the adjacent edges of said inwardly projecting ribs, and valve stem means connected with each said pneumatically independent tubular portion of said inner-tube structure.

4. In a pneumatic tire of the class described, the combination of a tire casing having a plurality of inwardly projecting and circumferentially disposed annular ribs adapted to divide the interior of said casing into a plurality of interconnected chambers, each of said ribs having a bulbous inner edge portion in which is disposed a ring of flexible metallic reinforcement, and a like plurality of inner-tube means comprising pneumatically independent annular sections adapted to fit within and to be supported by the walls comprising the respective said chambers of said tire casing.

5. In a pneumatic tire of the class described, the combination of a tire casing comprising three inwardly projecting and circumferentially disposed annular ribs that are composed of the same material and are made integral with the wall portions of said tire casing, flexible metallic core means for reinforcing the interior edge portion of each of said ribs, said ribs being so proportioned and so disposed within the tire that they form three inter-connected chambers, an inner-tube structure comprising three physically inter-connected but pneumatically independent annular portions each adapted to fit within and fill a corresponding said chamber of said tire casing when inflated, said inner-tube structure comprising also a medial construction adapted to engage with the interior edge portion of said ribs, and valve stem means connected with each pneumatically separate portion of said inner-tube structure.

6. In a pneumatic tire of the class described, the combination of a tire casing, a pair of inwardly projecting and substantially axially disposed annular ribs composed of the same material as said casing and made integral with the respectively opposite side wall portions thereof, a substantially radially disposed inwardly projecting annular rib made integral with the tread-wall portion of said tire casing and composed of like material, the inner edge portions of said axially and radially disposed ribs being adjacent to but not touching each other, and an inner-tube structure shaped to conform to the respective chamber portions into which the interior of said tire casing is divided by the aforesaid ribs, said inner-tube structure comprising a plurality of medial portions adapted to engage with the adjacent interior edge portions of said ribs and dividing said inner tube into three physically connected but pneumatically independent air chambers that fit within and are supported by said ribs and the walls of said tire casing.

7. In a pneumatic tire of the class described, the combination of a tire casing comprising a radially disposed annular rib composed of the same material and made integral with the tread-wall portion of said casing and comprising also a pair of substantially axially disposed circumferential interior ribs that likewise are of the same material as the body of said casing and made integral with the respective side-wall portions thereof, thereby dividing the interior of said casing into a pair of small outer annular chambers medially inter-connected with a large inner annular chamber, flexible metallic means for reinforcing the interior edge portions of each of said ribs, an inner-tube structure comprising two small outer and one large inner annular sections adapted to fit within the corresponding annular chambers of said tire casing, said annular sections being physically connected by a medial portion adapted to fit between the inner edge portions of said ribs, and separate valve-stem means connected pneumatically with each of the aforesaid sections of said inner-tube structure.

8. In a pneumatic tire of the class described, the combination of a tire casing comprising a substantially radially disposed interior annular rib made integral with the tread-wall portion of said tire casing, a pair of inwardly projecting and circumferentially disposed interior ribs made integral with the respective side wall portions of said tire casing and each having a bulbous inner edge portion provided with a medially disposed ring of flexible metallic reinforcement, the interior of said tire casing being divided by said ribs into three inter-connected chambers, an inner-tube structure divided into three physically connected but pneumatically independent annular sections adapted to fit within the corresponding said inter-connected chambers of the tire casing, and means for independently inflating each of said annular sections of said inner-tube structure.

9. In a pneumatic tire of the class described, the combination of a tire casing comprising a pair of inwardly projecting and circumferentially disposed annular ribs made integral with the respective side wall portions of said tire casing, a substantially radially disposed annular interior rib made integral with the tread-wall portion of said casing and comprising a bulbous inner edge reinforced with a flexible metallic ring disposed medially of said bulbous portion, the interior of said casing being divided by said ribs into a plurality of inter-connected annular chambers, and an inner-tube structure having physically connected but pneumatically independent annular tubular portions adapted to fit within the corresponding said chambers of said tire casing, and means for inflating each of said pneumatically independent inner-tube portions.

10. In a pneumatic tire of the class described, the combination of a tire casing comprising an interior annular rib made integral with the tread-wall portion thereof and having a bulbous inner edge with which is incorporated a ring of flexible metallic reinforcement, a pair of substantially axially disposed circumferential interior annular ribs made integral with the respective side wall portions of said tire casing each having a bulbous inner edge reinforced with a flexible metallic ring, the interior of said tire casing being divided by said ribs into a pair of outer chambers adjacent the tread portion of said tire casing and inter-connected with a third inner chamber bounded by the side walls of said casing and said horizontally disposed ribs, and an inner-tube structure comprising a pair of tubular portions adapted to fit within the corresponding said pair of outer chambers of the tire casing and having a third tubular portion adapted to fit within the said third inner chamber of the tire casing said tubular portions being physically connected but pneumatically independent, and valve stem means connected pneumatically with each of said tubular portions of said inner tube.

11. In a pneumatic tire of the class described, the combination of a tire casing comprising substantially radially disposed circumferential annular ribs on the interior of said casing and angularly converging, the extremities of said ribs being separated by a predetermined space, an inner tube structure divided into three physically connected annular sections adapted to fit within the casing and having a wall portion extending between the said extremities of said ribs, the spacing of said extremities being just sufficient to enable the inter-positioning of the said wall of said inner tube to lend support to the casing when the casing is under load.

DAVID O. McCLAY.